United States Patent
Sapru et al.

(10) Patent No.: US 6,340,376 B1
(45) Date of Patent: Jan. 22, 2002

(54) METHOD FOR COMBINING METALS WITH DIFFERENT MELTING POINTS

(75) Inventors: Krishna Sapru; Subramanian Ramachandran; Lu Ming, all of Troy, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 09/472,289

(22) Filed: Dec. 27, 1999

Related U.S. Application Data

(63) Continuation-in-part of application No. 09/024,098, filed on Feb. 17, 1998, now abandoned.

(51) Int. Cl.$^7$ .............................. C22C 1/02; C22B 9/05
(52) U.S. Cl. ................ 75/10.14; 75/10.65; 420/590
(58) Field of Search ................... 750/10.14, 10.65; 420/590

(56) References Cited

U.S. PATENT DOCUMENTS 4,584,015 A * 4/1986 Hartwig et al. ............ 75/10.14

FOREIGN PATENT DOCUMENTS

GB       7927 A * 4/1915 ................. 420/590

OTHER PUBLICATIONS

CRC Handbook of Chemistry and Physics, 79th edition, 1998, pp. 4–54 and 4–65.*

* cited by examiner

Primary Examiner—Roy King
Assistant Examiner—Tima McGuthry-Banks
(74) Attorney, Agent, or Firm—Philip H. Schlazer; Marvin S. Siskind

(57) ABSTRACT

A method for combining a first metal with a second metal where the melting point of the second metal is higher than the melting point of the first metal. The first and second metals are melted in separate crucibles. The second molten metal is introduced onto or into the first molten metal. Also described is a two-zone furnace for carrying out the method.

8 Claims, 2 Drawing Sheets

METHOD FOR COMBINING METALS WITH DIFFERENT MELTING POINTS

RELATED APPLICATION INFORMATION

The application is a continuation-in-part application of U.S. application Ser. No. 09/024,098 filed on Feb. 17, 1998 now abandoned.

FIELD OF THE INVENTION

The invention disclosed herein relates generally to method of combining metals. More specifically, this invention relates to a method of combining metals with different melting points.

BACKGROUND OF THE INVENTION

Induction melting is the technique of melting materials that are electrical conductors by establishing electrical current in these materials. The current is induced by a changing magnetic flux created by the passage of current in the radio frequency range through a set of induction coils that surround the material. An alternating current in the induction coils results in a changing magnetic flux. The changing magnetic flux results in an induced current in tie material. Flow of current in a conductor will result in joule heating that raises the temperature of the material. Note that the objects being heated need not be a magnetic material to heat efficiently. All that is required is that it have reasonably good electrical conductivity. Most ferrous and nonferrous metals can be heated and melted inductively. Induction melting furnaces use the principle of induction melting. A typical induction furnace comprises a single melting crucible that is surrounded by an induction coil connected to a source of alternating current.

A vacuum induction furnace having a single melting crucible may be used, in certain circumstances, to melt two different metals together in the furnace's single crucible even though there are substantial differences between the melting points of the two metals. For example, 100% magnesium (Mg) has a melting point of about 650° C. and 100% nickel (Ni) has a melting point of around 1453° C. However, Mg and Ni can form the intermetallic compound $Mg_2Ni$ that has a melting point of about 760° C. Hence, Mg and Ni can be melted in the same crucible at the 760° C. melting point of $Mg_2Ni$. At this temperature, there would not be substantial vaporization of magnesium.

In contrast, magnesium and iron cannot easily be melted in the same crucible. Unlike the Mg-Ni system described above, magnesium and iron is not known to form an intermetallic compound. Hence, to melt magnesium and iron in the same crucible, the crucible would have to be heated above the 1535° C. melting point of iron. At this temperature, there would be substantial magnesium vaporization. Hence, there is a need for a new method to combine metals having different melting points and especially metals lacking intermetallic compounds.

SUMMARY OF THE INVENTION

One objective of the present invention is to provide a method of combining a first metal with a second metal where the melting points of the first metal and the second metal are different.

This and other objectives are satisfied by a method for combining a first metal with a second metal, said method comprising the steps of: providing the first metal and the second metal were the melting point of the second metal is greater than the melting point of the first metal; melting the first metal in a first melting crucible to produce a first molten metal; melting the second metal in a second melting crucible to produce a second molten metal; and introducing the second molten metal onto or into the first molten metal.

DETAILED DESCRIPTION OF THE INVENTION

Disclosed herein is a new method for combining metals having different metal points. In particular, disclosed herein is a method of combining a first metal with a second metal where the melting point of the first metal is lower than the metal point of the second metal. Preferably, the melting point of the second metal is at least twice the melting point of the first metal. It is more preferable that the first and second metals lack intermetallic compounds.

The method includes the step of providing the first metal and the second metal where the melting point of the first metal is less than the melting point of the second metal. Generally, the first metal may be a substantially pure metal or it may be an alloy. Likewise, the second metal may be a substantially pure metal or it may be an alloy. The first metal is heated in a first melting crucible so as to produce a first molten metal. The second metal is heated in a second melting crucible (which is distinct from the first melting crucible) so as to produce a second molten metal. The second molten metal (i.e., the metal with the higher melting point) is introduced either into or onto the first molten metal (i.e, the metal with the lower melting point). Preferably, the second molten metal from the second melting crucible is allowed to flow or drip onto the first molten metal which is in the first melting crucible. As used herein the word "molten" implies that the metals are in the liquid state.

Figure 1:
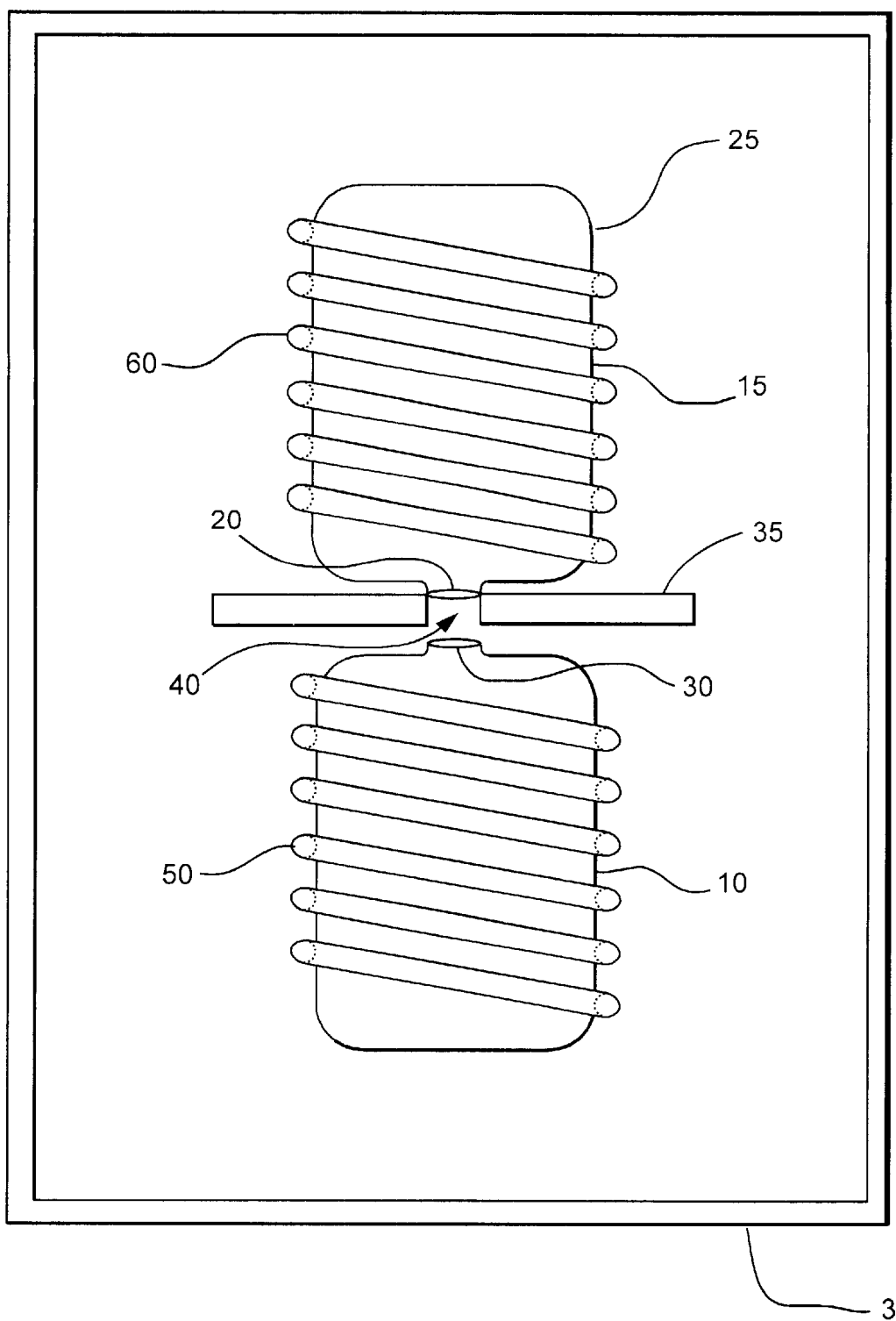
FIG. 1 is a highly stylized cross-sectional view of the two-zone vacuum induction furnace which may be used by the method of the present invention.

The method of the present invention may be carried out in a two-zone furnace. FIG. 1 depicts an embodiment of a two-zone furnace which may be used. As shown in FIG. 1, the apparatus comprises a vacuum chamber 3. The walls of the vacuum chamber are made from materials that can withstand the high temperatures of the furnace. Materials that may be used include, but are not limited to, quartz. A first melting crucible 10 and a second melting crucible 15 are both housed within the vacuum chamber 3. The first and the second melting crucibles are formed from materials that (1) can withstand the high temperatures of the furnace (typically around 2000° C.), and that (2) will not react with the elements that are being melted. Examples of materials that can be used include, but are not limited to graphite, alumina, and zirconia. In one embodiment of the present invention, the first and second melting crucibles are cylindrically shaped. Other shapes may also be used including, but not limited to, paraboloid and spherical.

A first metal is melted into a first molten metal in the first melting crucible. Likewise, a second metal is melted into a second molten metal in the second melting crucible. As defined herein, "first metal" refers to one or more metals in the solid state. Similarly, as defined herein, "second metal" refers to one or more metals in the solid state.

The second melting crucible is "unidirectionally fluidly connected" to the first melting crucible. This means that a liquid can flow out from the second melting crucible and into the first melting crucible; however, a liquid cannot flow from the first melting crucible and into the second melting crucible. Hence, the second molten metal can flow out from the second melting crucible and into the first melting crucible.

The second crucible may be unidirectionally fluidly connected to the first melting crucible in many different ways. FIG. 1 shows one way in which this may be done. In the embodiment of the present invention shown in FIG. 1, the second melting crucible is positioned above the first melting crucible. Hence, the second molten metal flows out of the second melting crucible and into the first melting crucible via the force of gravity. In the embodiment shown, the second melting crucible has an outlet port 20. The outlet port 20 is adapted to prevent passage of solid metal pieces of the second metal but to permit passage of the second molten metal. Examples of outlet ports include, but are not limited to, a single opening, a plurality of openings, a single nozzle, a plurality of nozzles, and a metal grid of sufficiently small mesh size to prevent passage of a solid metal but permit passage of a molten metal. The outlet port 20 may be adapted so that the rate at which the second molten metal flows from the second melting crucible can be controlled. The outlet port 20 of the second melting crucible is positioned to permit gravity flow of the second molten liquid from the second melting crucible 15. Preferably, the outlet port 20 is located on the bottom of the second melting crucible 15. The second melting crucible 15 may have an opened top end. However, to prevent the escape of vapors, the second melting crucible may include a removable lid 25 that can be used to cover the opened top end. The removable lid can be removed for loading of the solid materials to be melted and then securely attached during the melting process. The removable lid 25 may be securely attached to the open end of the crucible in many ways. Examples include a threaded connection or a latch mechanism. Alternately, the second-crucible may have a closed top end and a "side door" that can be easily opened and closed to permit loading of the solid materials to be melted.

The first melting crucible 10 may have an opened top end. Alternately, the first melting crucible may have a top end which is closed except for an inlet port. FIG. 1 shows an embodiment of a first melting crucible with an inlet port 30. In the embodiment shown in FIG. 1, the inlet port 30 of the first melting crucible 10 and the outlet port 20 of the second melting crucible 15 have been positioned so that the second molten metal in the second melting crucible 15 can flow, via gravity, into the inlet port 30 of the first melting crucible 10.

To permit loading of the first melting crucible 10 with solid materials, the top of the first melting crucible 10 may be designed with a removable lid (not shown). Alternately, the first melting crucible 10 may be designed with a side door that can be easily opened and closed for loading of the solid materials.

In another embodiment of the two-zone furnace, the outlet port 20 of the second melting crucible 15 may be fluidly connected to the inlet port 30 of the first melting crucible 10 via a passage tube. Furthermore, the flow of second molten metal into the first melting crucible may be automatically controlled. In this case, the second melting crucible need not be placed directly above the first melting crucible. Instead, the two may be horizontally displaced.

It is also possible that the first and second melting crucibles are placed side-by-side. In this case the outlet port of the second crucible is also fluidly connected to the inlet port of the first crucible by a passage tube. The second molten metal from the second crucible may then be mechanically pumped into the inlet port of the first melting crucible.

It is noted that the second molten metal may be introduced either onto or into the first molten metal. For example, the second molten metal may be allowed to simply flow or drip onto the surface of the first molten metal. Alternately, the second molten metal may be introduced into the first molten metal. For example, the second molten metal may be introduced below the surface of the first molten metal such as by a lance that penetrates the surface of the first molten metal.

In general, the first and second metals may be heated in any way including, but not limited to, resistive heating and induction heating. Since, in the method of the present invention, the second metal has a higher melting point than the first metal, the heating means is preferably adapted so that the second melting crucible (or the second metal within the second melting crucible) is heated to a higher temperature than the first melting crucible (or first metal within the first melting crucible).

Preferably, the first and second metals are heated and melted via induction heating. As discussed above, induction melting is the technique of melting materials that are electrical conductors by setting up a current in these materials. The current is induced by the changing magnetic flux in these materials. The induced current is created by the passage of current in the radio frequency range through a set of coils that surround the material.

The two-zone furnace which may be used to carry out the method of the present invention preferably operates by inductively melting the first metal into a first molten metal within the first melting crucible and the second metal into a second molten metal within the second melting crucible. Hence, the two-zone furnace further comprises means for inductively melting the first metal and the second metal.

In one embodiment of the two-zone furnace, the means for inductively melting is a first induction coil positioned around the first melting crucible and a second induction coil positioned around the second melting crucible. FIG. 1 shows a first induction coil 50 wrapped helically around the first melting crucible and a second induction coil 60 wrapped helically around the second melting crucible. In this embodiment the induction coils are located within the vacuum chamber. Note that the induction coils need not actually touch the melting crucibles. Each of the induction coils may be independently controlled by separate power supplies (not shown) so that the temperatures of the first and the second melting crucibles can be independently controlled. The induction coils are preferably water-cooled.

In another embodiment of the two-zone furnace, the first and second induction coils may be integrated into the first and second melting crucibles. In yet another embodiment of the invention, the first and second induction coils may be positioned around the first and second-melting crucibles respectively, but wound around the outside of the walls of the vacuum chamber. Any induction melting arrangement known in the art will be sufficient so long as the first induction coil effectively melts the first metal and the second induction coil effectively melts the second metal. Since, in the method of the present invention, the second metal has a melting point which is greater than the first, the two coils are preferably adapted so that the second coil heats the second metal to a temperature which is higher than that in which the first coil heats the first metal.

In an alternate embodiment of the two-zone furnace, a single induction coil attached to a single power supply may be used to melt both the first and second metals. The amount of energy supplied to the first and second metals by the single induction coil can be controlled by appropriately choosing the number of turns of the induction coil that are wrapped around each of the melting crucibles. Increasing the number of turns increases the amount of the magnetic flux. This leads to increased joule heating of the material within the melting crucibles.

The single induction coil may be positioned around both the first and the second melting crucibles. It may be located inside the vacuum chamber by preferably being wrapped around the first and the second melting crucibles. Alternately, it may form an integral part of the first and second metal crucibles. Alternately, it may be located outside the vacuum chamber by preferably being wrapped around the outside of the vacuum chamber. Other positions are also possible so long as the single induction coil effectively melts both the first and second metals. Hence, since the second metal has a melting point greater than the first metal, the single coil is preferably adapted so that it heats the second metal to a temperature which is higher than that to which is heats the first metal.

The two-zone furnace may further include means for thermally insulating the first melting crucible from the second melting crucible. As discussed above, the two metals that are being melted together have different metal points. Furthermore, they may have substantially different melting points. In fact, the melting point of the second metal may be two or more times (i.e., at least twice) the melting point of the first metal. The temperatures within each of the melting crucibles should be kept substantially close to their intended temperature values throughout the melting process. Hence, it is important to prevent heat flow from the hotter melting crucible to the cooler one. Preferably, the first molten metal (i.e., the metal having the lower melting point and located in the first melting crucible) should be maintained between its melting point and its vaporization point prior to any contact with the second molten metal.

For example, when melting magnesium with iron, magnesium (i.e., the "first metal") would be melted in the first melting crucible at a temperature of about 650° C. while iron (i.e., the "second metal") would be melted in the second melting crucible at a temperature of about 1500° C. In order to prevent vaporization of the molten magnesium in the first melting crucible, there must be some means of preventing the transfer of heat from the second melting crucible to the first so that the temperature of the first melting crucible does not rise substantially. The transfer of heat may be through conduction, convention or through radiative heat transfer. In one embodiment of the invention, the means for thermally insulating is a layer of thermal insulation material 35 positioned between the first melting crucible and the second melting crucible. As shown in FIG. 1, the layer of thermal insulation material has an opening 40 positioned to permit the gravity flow of the second molten metal into the first melting crucible. The layer of thermal insulating material is preferably formed from a material that (1) can withstand the high temperatures of the vacuum furnace, (2) has a high reflectivity of thermal radiation, (3) has a low emissivity of thermal radiation. More preferably, the layer of thermal insulating material 35 is formed from material having a melting point greater than about 2000° C., and an emissivity below about 0.30 at 2000° C. Examples of materials that can be used include, but are not limited to, tungsten, molybdenum, and tantalum. In the embodiment of the two-zone furnace shown in FIG. 1, the two-zone furnace includes a vacuum chamber 3. The layer of thermal insulating material 35 may extend across substantially the entire cross-section of the vacuum chamber. In this manner the first melting crucible is substantially thermally isolated from the second melting crucible.

The first and second metals are preferably melted in a vacuum. Hence, it is preferable that the surrounding local environments of the first and second melting crucibles are preferably evacuated prior to the melting of the first and second metals. This may be done by placing the first and second melting crucibles inside a vacuum chamber 3 and then pumping the vacuum chamber down to a vacuum of about $10^{-3}$ torr or lower. This ensures that there is negligible quantity of contaminant gases (i.e., oxygen—in those systems where the presence of oxygen must be avoided). The vacuum chamber may then be back-filled with an inert gas such as argon or helium, which provides an inert "gas blanket" keeping the partial pressure of the contaminant gases low.

The second metal having the higher melting point is introduced either into or onto the first metal having the lower melting point. Hence, the molten metal having the higher melting point will be allowed to flow into or onto the molten metal that is at the lower temperature.

EXAMPLE

A two-zone furnace using induction coils and housed in a vacuum chamber was used to combine magnesium with iron. Magnesium has a melting point of about 650° C. and a boiling point of about 1090° C. Iron has a melting point of about 1535° C. and a boiling point of about 2750° C. For proper operation of the two-zone furnace, the material having the higher melting point (i.e., the iron) was placed into the second melting crucible and allowed to drip into the first melting crucible containing the material with the lower meting point (i.e., the magnesium) . Both the magnesium and the iron were ground to a powder. The iron and magnesium were each heated to their melting points to form molten iron and molten magnesium. The molten iron was allowed to drip from the second melting crucible onto the molten magnesium in the first melting crucible. Note that reversing the order of operation of the furnace (i.e., allowing the molten magnesium to drip into the molten iron) would result in magnesium vaporization.

Figure 2:
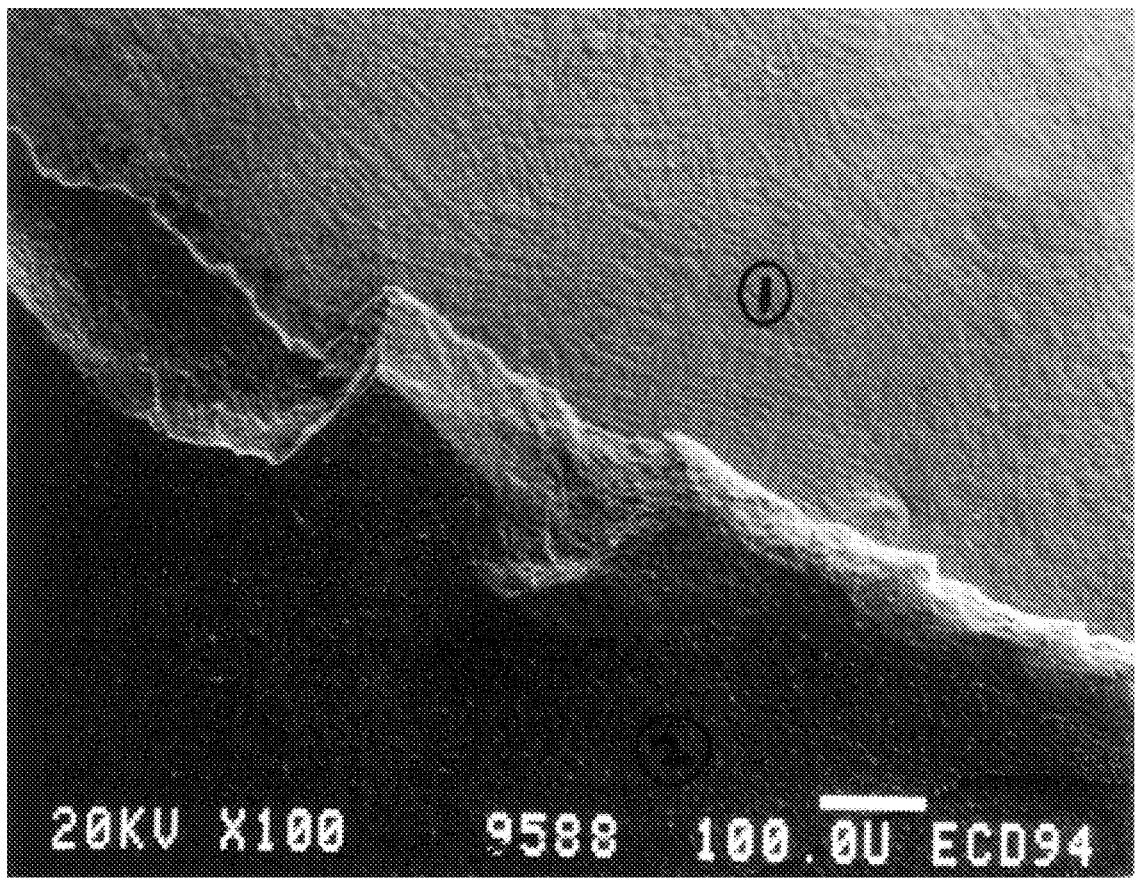
FIG. 2 is a photograph showing a two-phase composition comprising magnesium and iron formed in the two-zone furnace of the present invention.

FIG. 2 is an SEM photograph of a two-phase material that was formed in the first melting crucible. The photograph shows a first phase 70 comprising magnesium and a second phase 75 comprising a Mg-Fe composition having the atomic ratio $Mg_{10}Fe_{90}$.

It is noted that magnesium and iron cannot easily be melted in the same crucible. Unlike the Mg-Ni system described above, magnesium and iron are not known to form an intermetallic compound with each other. Hence, to melt magnesium and iron in the same crucible, the crucible would have to be heated above the 1535° C. melting point of iron. At this temperature, there would be substantial magnesium vaporization. Hence, a single zone furnace with only a single melting crucible is inadequate for melting two or more metals with certain physical properties. There is thus a need for a new method for combining metals with different metals points and especially those metals which do not form intermetallic compounds.

While the invention has been described with reference to a particular exemplifications and embodiments thereof, it is not intended to be limited to the exemplification and embodiments described. Rather, it is the claims appended hereto and all reasonable equivalents thereof which define the scope of the present invention.

We claim:

1. A method for combining a first metal with a second metal, said method comprising the steps of:
   providing said first metal and said second metal, the melting point of said second metal being greater than the melting point of said first metal;
   melting said first metal in a first melting crucible to form a first molten metal;
   melting said second metal in a second melting crucible to form a second molten metal; and
   introducing said second molten metal onto or into said first molten metal in said first melting crucible.

2. The method of claim 1, wherein said first metal melting step and said second metal melting step are performed in a vacuum.

3. The method of claim 2, wherein said vacuum is back-filled with an inert gas.

4. The method of claim 1, wherein said first metal melting step comprises the step of inductively heating said first metal.

5. The method of claim 1, wherein said second metal melting step comprises the step of inductively heating said second metal.

6. The method of claim 1, wherein the metal point of said second metal is at least twice the melting point of said first metal.

7. The method of claim 1, wherein said first metal and said second metal lack intermetallic compounds.

8. The method of claim 1, wherein said first melting crucible and said second melting crucible are substantially thermally isolated.

* * * * *